United States Patent [19]

Rupp

[11] 3,805,410

[45] Apr. 23, 1974

[54] VEHICLE DRYING ASSEMBLY

[75] Inventor: Dean C. Rupp, Burnsville, Minn.

[73] Assignees: Rupp Industries, Inc., Bloomington, Minn.; Passpoint Corporation, Maryland Heights, Md.

[22] Filed: Mar. 10, 1972

[21] Appl. No.: 233,616

[52] U.S. Cl. ........................ 34/225, 34/229, 34/233

[51] Int. Cl. ............................................ F26b 19/00

[58] Field of Search ............ 34/105, 222, 229, 233, 34/243 C, DIG. 13; 15/DIG. 2, DIG. 7, 405; 134/123

[56] References Cited

UNITED STATES PATENTS

| | | | |
|---|---|---|---|
| 2,663,951 | 12/1953 | Kennison | 34/233 |
| 3,583,686 | 6/1971 | Mackey | 34/105 |
| 3,409,995 | 11/1968 | Greenwood et al. | 34/229 |
| 3,584,395 | 6/1971 | Peters | 34/229 |

*Primary Examiner*—Kenneth W. Sprague
*Assistant Examiner*—James C. Yeung

[57] ABSTRACT

A vehicle drying assembly installed in a building including an air supply means communicating with an air discharge tunnel. The air discharge tunnel is provided with a plurality of air discharge nozzles purposefully designed and relatively arranged to effectively dry or remove water or other fluid dispersed about the surface of a vehicle or other object moving through the tunnel. A series of wedge-shaped curtains or streams of air impinge upon the vehicle surface to drive water off. Side nozzles strip water off the sides of the vehicle. The air supply means supplies hot dry air to the discharge tunnel. The air supply means is also operative to heat the building when the air discharge tunnel is not in use.

18 Claims, 10 Drawing Figures

VEHICLE DRYING ASSEMBLY

BACKGROUND OF THE INVENTION

Automatic car washing installations typically provide a plurality of stations through which a vehicle being washed is advanced, including at least a wash station, a rinse station and a drying station. In the prior art there are provided vehicle drying assemblies for use in such car wash installations which dry the vehicle with currents of hot air. For example, see U.S. Pat. No. 3,432,346 to Hurst and U.S. Pat. No. 3,337,896 to Allen. Such assemblies typically disperse relatively random currents of air about the vehicle and rely largely on evaporation to dry the vehicle. The assembly may provide linear currents of air which laterally impinge upon the surface of the vehicle. See U.S. Pat. No. 2,758,392 to Vani et al. The net effect is little more than to rearrange the water on the vehicle surface. The large blowers required are noisy and power-consuming. As room air is generally recirculated through the assembly, steam and high humidity result.

Due to the foregoing disadvantages, hot air dryers of the prior art find only limited application in modern-day car wash installations. Rather, drying stations are supplemented by the use of followers or arms mounted with spinning rags or brushes to dry the vehicle. Portions of the car must be manually dried. The arms or followers frequently cause damage as by scratching the vehicle or removing an aerial or the like.

SUMMARY OF THE INVENTION

The invention relates to a vehicle drying assembly for use in conjunction with an automatic vehicle washing installation. The assembly includes a generally arch-shaped air discharge tunnel and an air supply means. The discharge tunnel is provided with a plurality of air discharge means constituted as air discharge nozzles of a design and relative arrangement to effectively remove over 90 per cent of the water dispersed over a vehicle having just passed through a rinse station. Nozzles on the upper portion of the tunnel are arranged in pairs forming a series of V's. Hot, dry air is discharged through the nozzles at a velocity of approximately 130–140 mph to form a series of wedge-shaped curtains of air. The angular frontal lines provided by the air curtains drive water laterally outward and off the vehicle surface. Residual water is removed by evaporation. Nozzles disposed on the inner side of the tunnel strip water off the sides of the vehicle. Side nozzles have breakaway means to prevent damage in the event of being struck by a vehicle.

Air supply means supplies the tunnel with air heated to approximately 135° F at a pressure sufficient that the required air discharge velocity is attained. A preselected portion of the air supplied is drawn by blower means through a fresh air intake and is heated by a direct line fired burner. A portion of the air is consumed in burner combustion. The air is directed through a first air passageway to the discharge tunnel. Normal operation of the drying assembly provides sufficient heat to the building that supplemental heat is not required. With the air discharge tunnel is not in use, the air supply means is operative to provide heated air to the interior of the building through a second or alternative air passageway.

An object of the invention is to provide an efficient vehicle drying assembly operable to effect nearly complete removal of water from the surface of a vehicle. A second object of the invention is to provide such an assembly having no parts making physical contact with the vehicle surface. A further object is to provide such an assembly having a plurality of air discharge means cooperable to form a wedge-shaped air curtain to effect removal of water from the vehicle surface. A further object is to provide such an assembly having an air supply means to supply hot, dry air to the air discharge means and operable to supply heat to the surrounding building when the vehicle drying assembly is not in use.

IN THE DRAWINGS

DESCRIPTION OF A PREFERRED EMBODIMENT

Figure 1:
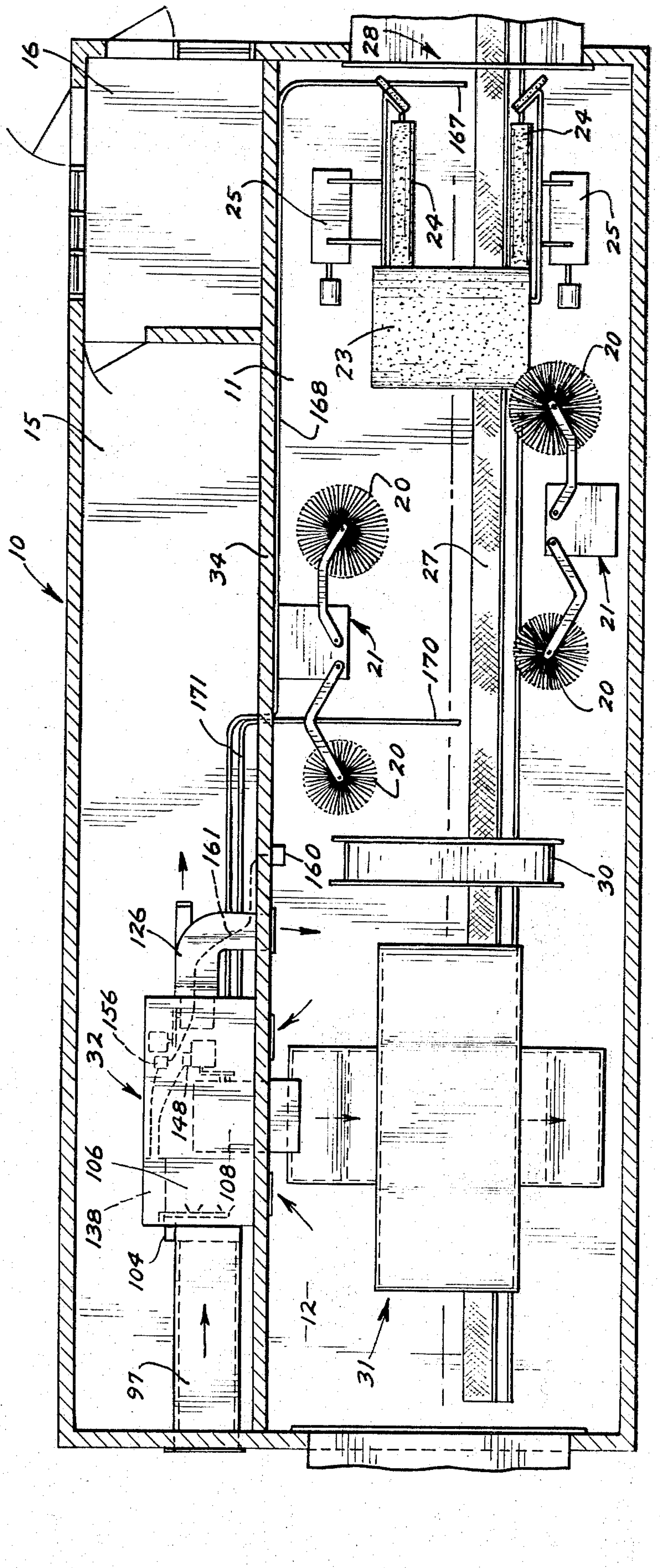
FIG. 1 is a top plan view of a vehicle washing system in an enclosed building including a vehicle drying assembly of the present invention.

Referring now to the drawings, there is shown in FIG. 1 a vehicle washing system, for example a car wash system, installed within a closed building, indicated generally at 10. The car wash system includes a washing station and a drying station, indicated generally at 11 and 12. The building 10 may also include other partitioned areas, such as a mechanical equipment room 15 and an office 16, as the car wash may be adjunct to a gasoline or service station. The vehicle washing station, which forms no part of the present invention, includes a plurality of vehicle washing brushes 20 for scrubbing the body of the vehicle, driven by a suitable motor and linkage assembly 21. In addition, there is included an overhead brush 23, as well as rocker panel and tire brushes 24 driven by suitable motors 25. Usual and preferred conveying means 27 may be provided to advance the vehicle through the car wash.

In operation, a vehicle such as a standard automobile enters the building through a front door or entryway 28 and is connected to the conveying means 27 to be first advanced through the washing station 11. Liquid cleaning solution is sprayed on the vehicle from a suitable location, not shown, as from nozzles located on the ceiling of the room. Tire brushes 24 scrub the tires and rocker panel, while overhead brush 23 scrubs the top of the car. The plurality of brushes 20 clean the main body of the vehicle. The vehicle passes under a rinse station 30, which may also include a spray of hot wax, then into the drying station 12 where the vehicle is dried by the vehicle drying assembly of the present invention.

Figure 2:
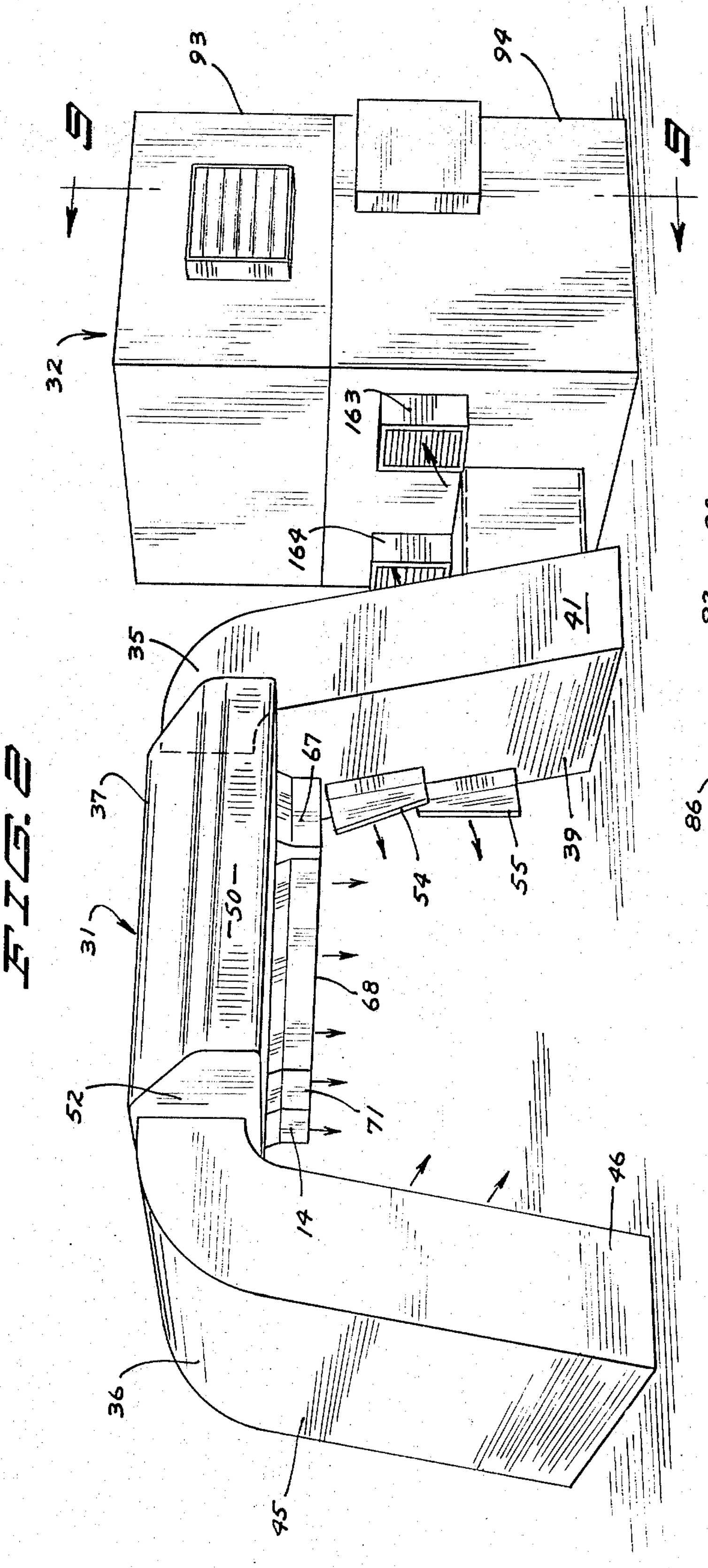
FIG. 2 is a perspective view of the vehicle drying assembly of the present invention.

As shown by FIG. 2, the vehicle drying assembly includes air discharge housing constituted as air discharge tunnel 31, and air supply means 32. In the plan view of FIG. 1, the air supply means 32 is arbitrarily shown separated from the air discharge tunnel 31 by a partition wall 34 with openings in the wall provided for necessary duct work and air passages, as will be presently described. The air supply structure may or may not be so partitioned from the air discharge structure, according to the option of the car wash operator.

Air discharge tunnel 31 is arch-shaped, having right and left inwardly sloping legs 35, 36 and a bridging top section 37 defining an archway 38. The legs 35, 36 and the top section 37 constitute interconnected air housing chambers or plenum chambers. Right leg 35 has an interior wall 39 spaced apart from and generally parallel to an exterior wall 40, and side walls 41, 41 closing the chamber of right leg 35. Likewise, left leg 36 has an interior wall 44 spaced apart from and generally parallel to an exterior wall 45, and side walls 46, 46 closing the chamber of left leg 36. Right and left legs 35, 36 may also have sealed bottom walls (not shown) or, alternatively, they could be fixed in air-tight relationship relative to the floor.

Top section 37 comprises a generally rectangular elongated chamber having a top wall 48, a bottom wall or base 49, front and rear walls 50, 51 and sealed side walls 52. The center portion of top wall 48 is generally parallel to the base 49, having front and rear end portions inclined downward to front and rear walls 51, 52. The upper ends of right and left legs 35, 36 curve inward and join the top section 37 at side walls 52. Right and left legs 35, 36 support the top section 37 and are open to it whereby free air passage is allowed throughout the interior of the air discharge housing 31.

The air discharge tunnel of the present invention is provided with a plurality of linear, elongated air discharge means constituted as a plurality of air discharge nozzles of a design and relative arrangement whereby water is removed from the surface of an object with far greater efficiency than provided by air discharge water removers of the prior art. Top section 37 is provided with a plurality of linear, relatively narrow elongated discharge nozzles downwardly directed and arranged in pairs to create, in conjunction with the air supply means, a series of V or wedge-shaped curtains of air which impinge upon the surface of the vehicle or other object to be dried. The wedge curtain of air has a driving or plowing effect on water dispersed about the surface of the vehicle as the vehicle is moved relative to the wedge. Laterally outward movement is imparted to the water encountering the air curtain, and it is driven off the side of the vehicle along the angular frontal line of the air wedge. In the preferred embodiment, as hot dry air is employed, much water is also removed by evaporation. Side walls 35, 36 are also provided with linear elongated air discharge means, constituted as air discharge nozzles which direct air jets angularly impinging upon the side of the vehicle to strip water away.

Figures 3, 4, 5, 6, 7:
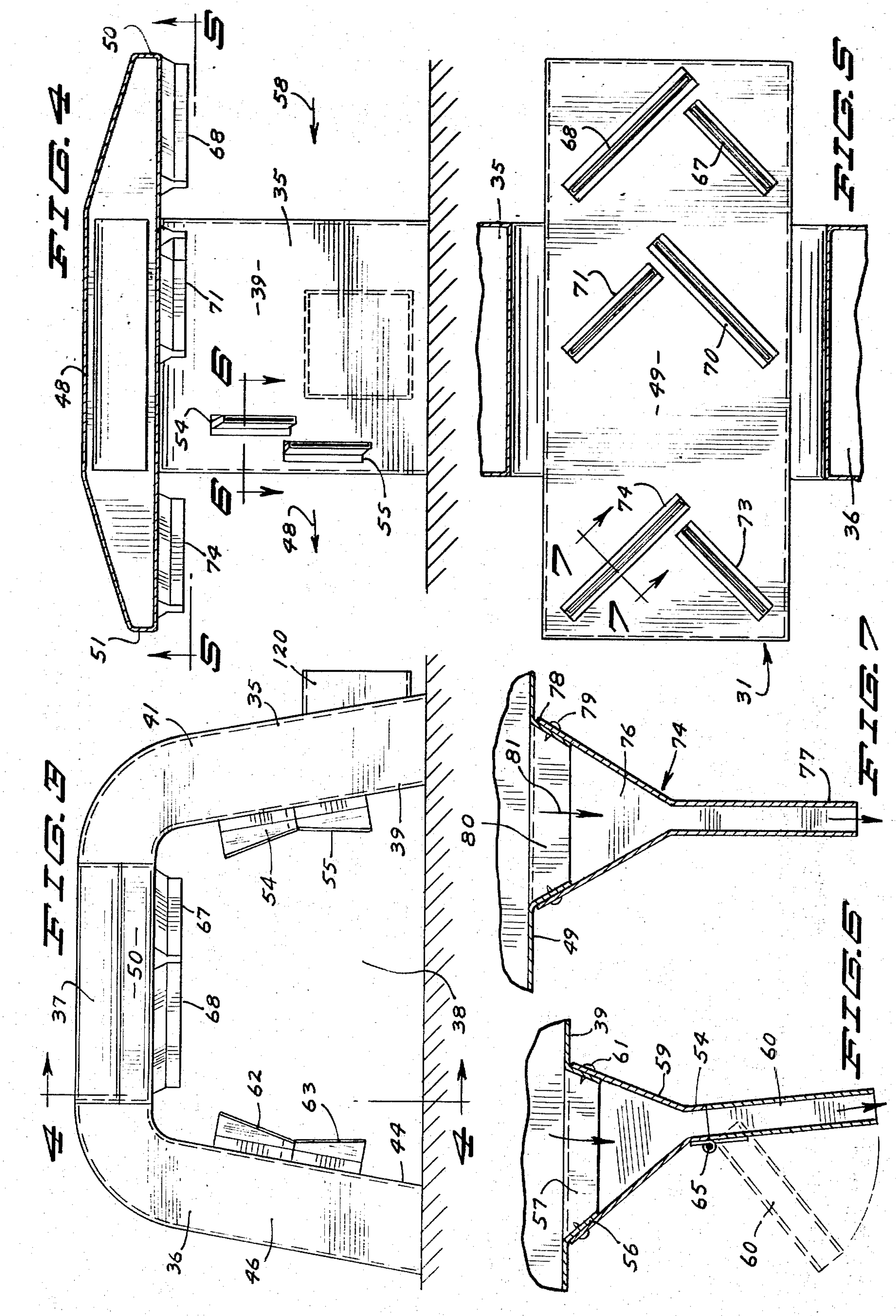
FIG. 3 is a front elevational view of the air discharge tunnel of the vehicle drying assembly.
FIG. 4 is a sectional view of the air discharge tunnel of FIG. 3 taken along the section line 4—4 of FIG. 3.
FIG. 5 is a sectional view of the air discharge structure taken along the section line 5—5 of FIG. 4.
FIG. 6 is a sectional view of an air discharge nozzle of the air discharge structure taken along the section line 6—6 of FIG. 4.
FIG. 7 is a sectional view of a second air discharge nozzle of the air discharge structure taken along the section line 7—7 of FIG. 4.

Referring to FIG. 5, the base 49 of top section 37 is provided with a series of longitudinal elongated air discharge nozzles relatively positioned in pairs, shown to include a forward pair of right and left nozzles 67, 68; a center pair of right and left nozzles 70, 71; and a rear pair of right and left nozzles 73, 74. The longitudinal axes of the respective nozzles are forwardly inclined toward the center of top section 37 and have adjacent ends whereby each pair of nozzles defines a forwardly pointed wedge or V. In each pair of nozzles, one nozzle is longitudinally longer than the other, extending forward of and overlapping an imaginary extension of the axis of the shorter nozzle. For example, as shown, left forward nozzle 68 is longer than right forward nozzle 67, overlapping an imaginary extension of the axis of right nozzle 67. The relative positioning of the overlapping nozzle of each pair of nozzles is staggered, whereby right nozzle 70 is the overlapping nozzle of the center pair and left nozzle 74 is the overlapping nozzle of the rear pair of nozzles. The several pairs of nozzles form a series of V shapes having generally longitudinally aligned apexes.

The typical cross section of the nozzles disposed on base 49 is illustrated in FIG. 7 wherein there is shown a cross sectional view of left rear nozzle 74. The nozzle 74 has an inlet section 76 having side walls outwardly converging from an inlet opening 80 to integral throat discharge section 77, assuming generally a funnel shape. The end of inlet section 76 fits over outwardly turned flanges 78 skirting the perimeter of inlet opening 80 whereby the chamber of top section 31 is open to the nozzle to allow air discharge as indicated by the arrow 81. Suitable screws 79 hold the nozzle 74 securely in place. The longitudinal ends of the nozzle are closed by suitable end plates.

The right and left legs 35, 36 of tunnel 31 are also provided with air discharge means constituted as a plurality of relatively spaced air discharge nozzles. Referring to FIG. 4, there is shown a pair of longitudinally elongated air discharge nozzles 54, 55 fastened to the interior wall 39 of right leg 35 communicating with the plenum chamber of right leg 35 through inlet openings provided in the interior wall 39. The discharge nozzles are disposed in horizontal and vertical spaced relationship, the upper end of lower nozzle 55 vertically overlapping slightly with the lower end of the upper nozzle 54. Side nozzles 54, 55 are located between the center pair 70, 71 and the rear pair 73, 74 of nozzles located on top section 37.

The nozzles 54, 55 are similar in cross section, as may be seen in FIG. 6 wherein there is shown a vertical cross sectional view of the upper nozzle 54. An inlet opening 57 is provided in the interior wall 39 corresponding substantially to the length and width of the base opening of nozzle 54. Outwardly turned flanges 56 skirt the longitudinal perimeter of the inlet opening 57. Nozzle 54 has an inlet section or base 59 outwardly converging from substantially the width of inlet opening 57 to a narrow elongated throat section 60. Base 59 snugly engages the flanges 56 and is held securely in place by suitable means as screws 61.

While it is not anticipated that, in normal operation, a vehicle will strike any of the side nozzles, in the event that such an accident occurs, the side discharge nozzles are provided with safety means to prevent breakage of the vulnerable throat section 60. Throat section 60 is hingedly connected, as by hinge 65, to the base 59 and, in the normally closed position as shown, forms a continuous throat for passage of air. Hinge 65 is spring loaded to bias the throat section in the normally closed position. When accidentally struck by a vehicle, throat section 60 yields, being pivoted about the hinge 65 and moving out of the way. Upon the passing of the vehicle, the throat section is promptly urged back into place in alignment with base 59.

Opposite interior wall 44 of the left leg 36 is similarly provided with a pair of air discharge nozzles 62, 63 positioned in spaced relationship presenting a mirror image of the nozzles 54, 55 on right leg 35. The respective side nozzles are positioned to direct an air jet into archway 38 at an angle of approximately 9° forward, as shown by FIG. 6. In addition, as shown by FIG. 3, the throat exits of the upper side nozzles 54, 62 are inclined slightly downward relative to a vertical line. The combined effect of the side nozzles is to provide mutually opposing streams or jets of air impinging upon the sides of a vehicle having a chisel-like effect to strip water from the vehicle.

In the operation of the air dryer tunnel, a wet vehicle, having just been washed and rinsed, enters the archway 38 in the direction indicated by the arrow 58 of FIG. 4. In a preferred embodiment, hot air is provided to the tunnel 31 from the air supply means 32, as will be more fully described. The air supplied is preferably 125°–135° F, having a relative humidity of less than 25 per cent. The tunnel 31 is pressurized by the air supply means to a pressure of approximately 8 to 10 inches Hg above atmospheric pressure, providing an air discharge velocity from the various nozzles between 130 and 140 mph. The large volumes provided by the various chambers of tunnel 31 serve as stilling or settling chambers whereby the pressure within the tunnel 31 is relatively constant and significant air currents are not present within the tunnel. Thus the discharge velocity of the air is relatively constant at the various air discharge nozzles.

Figure 8:
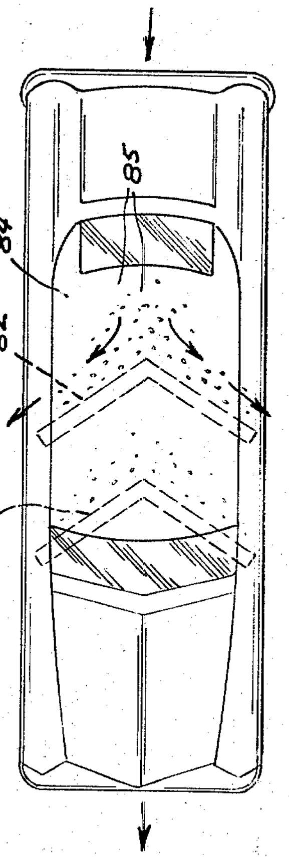
FIG. 8 is a schematic representation of the top surface of a vehicle being dried under the air discharge tunnel of the invention.

As the vehicle enters the archway 38, it encounters a first downwardly directed wedge-shaped air stream or curtain provided by the forward pair of nozzles 67, 68 located on the top section 37. The forward air curtain, schematically illustrated at 82 in FIG. 8, impinges upon the surface of a vehicle 84, driving dispersed water 85 laterally outward off the sides of the vehicle as it moves relative to the air curtain. The small amount of water penetrating the frontal barrier of the first air curtain and remaining on the vehicle, encounters a second wedge-shaped air curtain 86 provided by the center pair of nozzles 70, 71 located on top section 37. As the vehicle progresses through the tunnel 31, right and left side nozzles 54, 55, 62, 63 strip water from the sides of the vehicle. Any residual water remaining in pockets or grooves or the like on the vehicle is finally removed as the vehicle passes under the third wedge-shaped air curtain provided by the rear pair of nozzles 73, 74 located on top section 37.

As will be readily appreciated by those familiar with the many factors involved in the design of air distribution equipment, the dimensions of the various components and their geometrical relationship are quite important in determining their effect upon the air flow.

The following table is offered to illustrate specific dimensions and geometric relationships of a preferred embodiment of the air discharge tunnel of the invention which has displayed outstanding performance in the removal of water from vehicle surfaces.

TABLE A

| | |
|---|---|
| Air discharge tunnel **31**: | |
| Tunnel height from ground to base **49** | 77 inches |
| Inward inclination of right and left legs **35, 36** | 10 degrees |
| Width of base **49** | 71-⅝ inches |
| Air discharge nozzles on top section **31**: | |
| Length of long nozzles **68, 70, 74** | 48-⅝ inches |
| Length of short nozzles **67, 71, 73** | 36-⅝ inches |
| Angle of nozzles relative to longitudinal axis of top section **37** | 45 degrees |
| Angle of wedge formed by corresponding pairs of nozzles | 90 degrees |
| Inlet width **80** of nozzles **67-74** | 6-⅜ inches |
| Discharge width of throat **77** of forward pair r of nozzles **67, 68** | 1-⅛ inches |
| Ratio of inlet to discharge width of forward pair of nozzles **67, 68** | 5.6 |
| Discharge width of throat 77 of center and rear pairs of nozzles **70-74** | ** inch |
| Ratio of inlet to discharge width of center and rear pairs of nozzles **70-74** | 7.3 |
| Distance between forward pair **67, 68** and center pair **70, 71** of nozzles | 39-½ inches |
| Distance between center pair **70, 71** and rear pair **73, 74** of nozzles | 84-⅛ inches |
| Air discharge nozzles on right and left legs **35, 36**: | |
| Inlet width **57** of side nozzles **54, 55, 62, 63** | 5- inches |
| Discharge width of throat **60** of side nozzles | ¾ inch |
| Ratio of inlet to discharge width of side nozzles | 7.7 |
| Forward inclination angle of side nozzles | 9-½ degrees |
| Horizontal distance between upper and lower side nozzles **54, 55** and **62, 63** | 1-¼ inches |
| Vertical distance from top of upper nozzles **54, 62** to floor | 61-½ inches |
| Vertical distance from top of lower nozzles **55, 63** to floor | 41-½ inches |
| Length of side nozzles **54, 55, 62, 63** | 24-⅜ inches |

Satisfactory results have been achieved with slight variations of the above dimensions and relationships. It is understood that the above dimensions could be proportionately larger or smaller if the air discharge tunnel was meant to consistently accommodate particularly large or small vehicles, respectively.

Referring to FIG. 2, air supply means 32 includes a pair of housings or cabinets, an upper cabinet 93 resting on a lower cabinet 94. Air supply means 32 is functionally connected through a first air passageway to the air discharge tunnel 31 to supply hot dry air. Fresh air is drawn from outside the building through intake means. In normal operation of the vehicle drying assembly, the hot air supplied to the tunnel 31 to dry vehicles will be sufficient to heat the interior of the building 10. Air supply means is also functionally connected directly to the interior of the building 10 whereby, when the air discharge tunnel is inoperative, as at night and on holidays, hot air is supplied directly to the interior of the building through an alternate or second air passageway. The fresh air intake means regulates the amount of fresh air drawn into the air supply means. Blower means are operable to draw air through the intake means and discharge it through the first or second air passageway.

Figure 9:
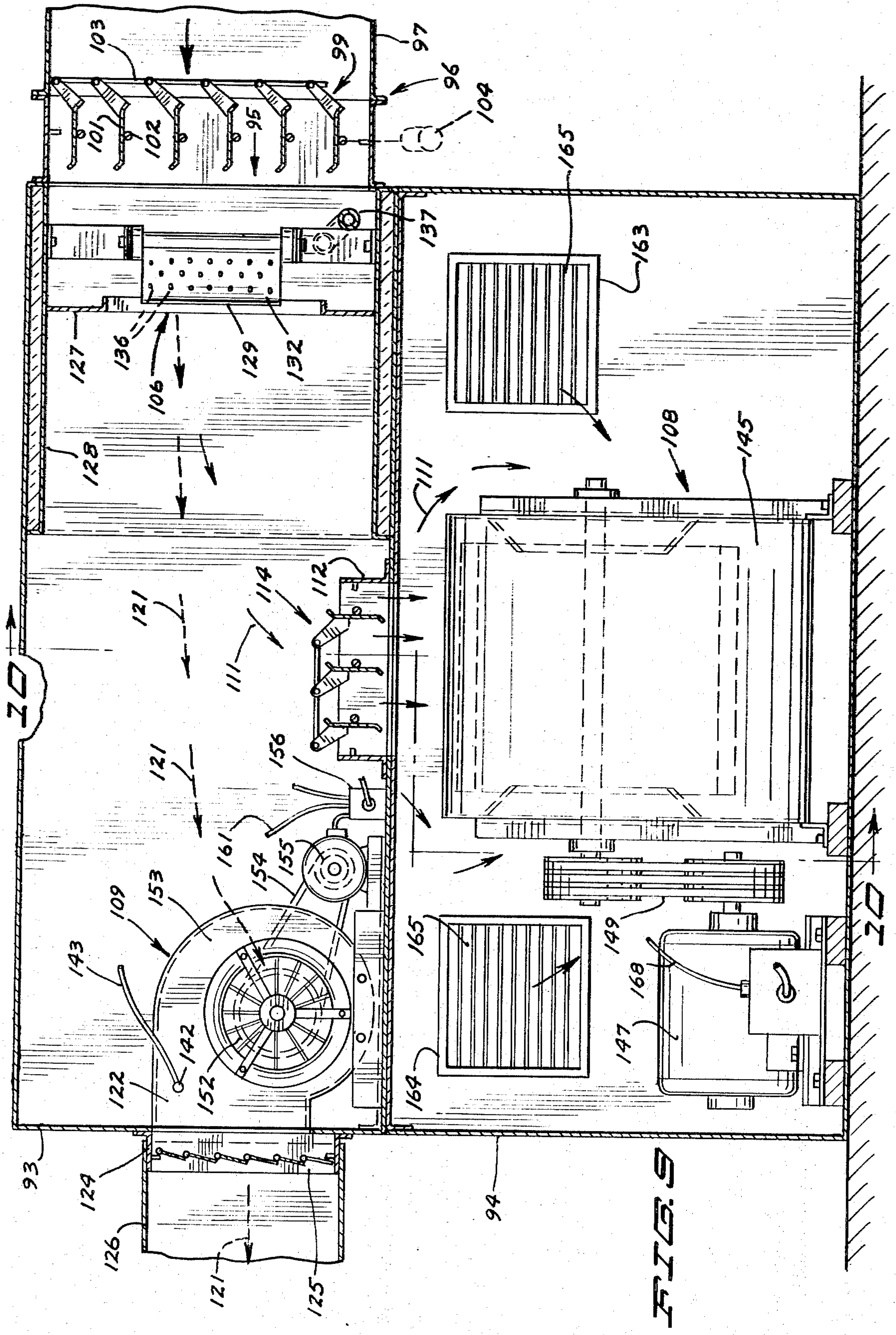
FIG. 9 is a sectional view of the air supply structure of the vehicle drying assembly taken along the section line 9—9 of FIG. 2.
Figure 10:
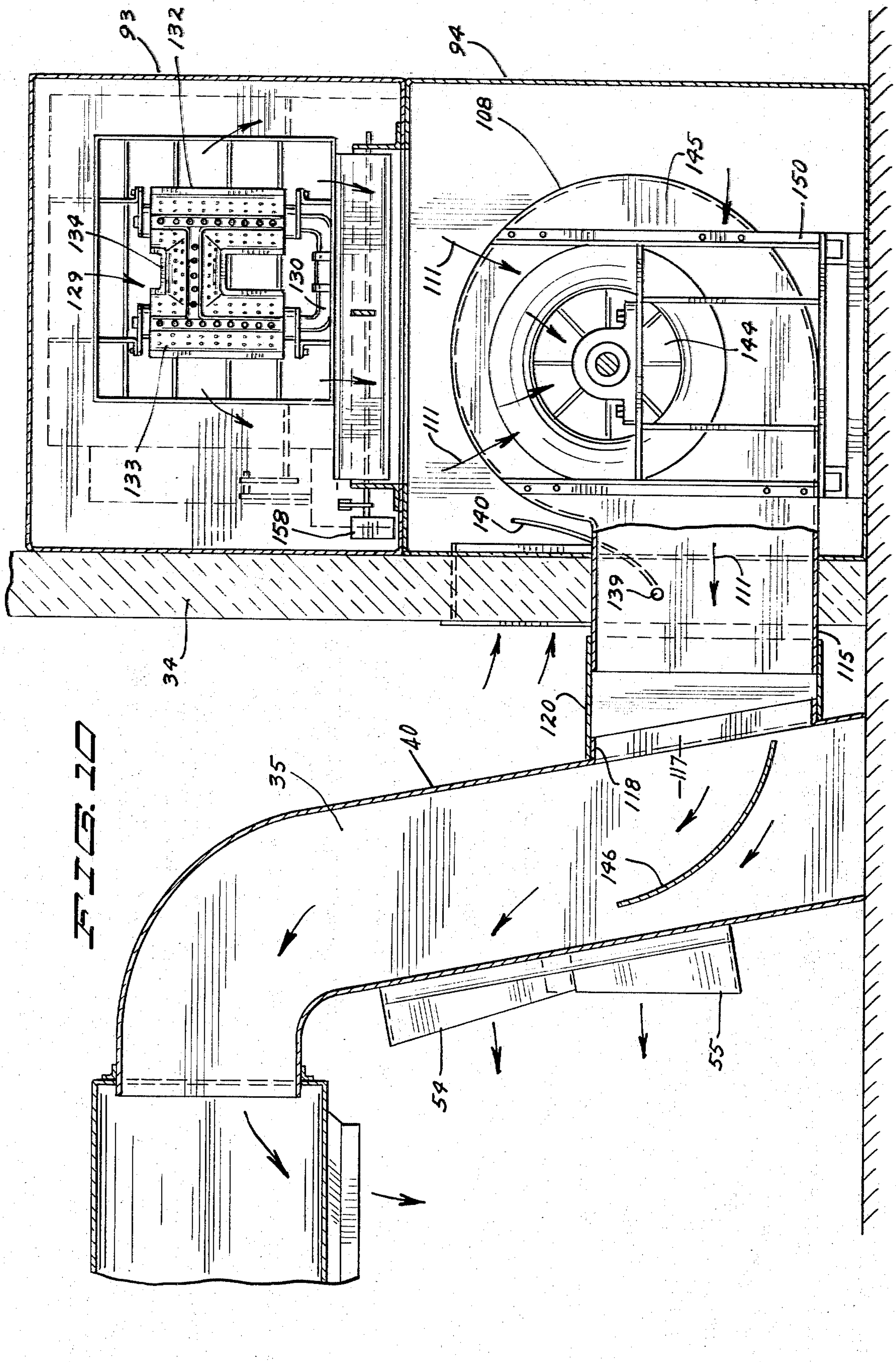
FIG. 10 is a sectional view of the air supply structure of FIG. 9 taken along the section line 10—10 of FIG. 9 and showing a portion of the air discharge structure.

Air supply means 32, as shown in FIGS. 9 and 10, has a fresh air intake, indicated generally at 96, communicating with the upper cabinet 93 through an inlet opening 95. Intake 96 includes an elongated air conveying duct 97 and a first damper assembly 99 located adjacent inlet opening 95. Duct 97 extends from an opening in the wall of the building 10 to the inlet opening 95. Inlet damper assembly 99 includes a plurality of vertically spaced damper blades 101 rotatably mounted on guide rods 102 operably connected by a connecting bar 103. The damper blades are rotatable together between a horizontal fully open position, as shown, and a vertical fully closed position. A servo-motor, schematically indicated at 104, is operable to move the damper blades between the open and closed positions.

Blower means includes a first or large blower unit 108 located in lower cabinet 94 and a second or small blower unit 109 located in upper cabinet 93, as will be more fully described. A first air passageway, as indicated by the arrows 111, extends from the intake means to the interior of cabinet 93 and through a duct 112 disposed between confronting surfaces of upper cabinet 93 and lower cabinet 94. Duct 112 is provided with closure means constituted as a second damper assembly 114 movable between an open position as shown and a closed position closing the duct. The first passageway extends through the duct 112 into the chamber of lower cabinet 94, through the large blower unit 108 to the discharge throat 115 of the blower unit 108. Right leg 35 of the discharge tunnel 31 is provided with a rectangular inlet opening 117 having a flanged perimeter 118. A connecting duct 120 snugly engages the flange 118 to connect the discharge tunnel opening 117 with the discharge throat 115 of the blower unit 108.

A second air passageway, indicated by the arrows 121, extends from the fresh air intake means through the chamber of upper cabinet 93 to the small blower unit 109. The discharge throat 122 of the small blower unit 109 faces a discharge duct 124 provided in the wall of the upper cabinet 93. Closure means constituted as a third damper assembly 125 is operable to close the duct 124, as shown. An air conveying duct 126 is provided to convey the air to the desired location inside the building. For example, referring to FIG. 1, the duct 126 has a branch extending into the utility room 15, and a branch extending into the drying station 12. The second air passageway extends through the blower unit 109 into the air conveying duct 126.

Air heating means 106 is disposed adjacent the fresh air intake to heat incoming air. In the preferred embodiment, heating means 106 includes a direct line fired burner, indicated generally at 129, such as the line burner disclosed in U.S. Pat. No. 3,051,464. Burner 129 is operative to heat air in a passing air stream by using a small amount of the air stream to effect at all firing rates complete stoichiometric combustion of the burner fuel. The efficiency and speed of heating the air are greatly increased over indirect heating means. Burner 129 has a transverse generally H-shaped manifold 130 having a transverse leg extending between a pair of opposing legs. Each leg carries a pair of diverging shielding and mixing walls 132, 133 and 134 forming transverse mouths which serve as combustion chambers for flame. The shielding and mixing walls 132, 133 and 134 have a plurality of openings 136 for directing air into the combustion chambers. Manifold 130 is coupled to a gas line 137 which supplies gaseous fuel to the burner. Gas line 137 is connected to a gas modulation and burner controller, indicated schematically at 138 in FIG. 1. An external source (not shown) provides gaseous fuel to controller 138. A first temperature probe 139 is located in the discharge throat 115 of the large blower 108 and is functionally coupled by probe line 140 to controller 138. A second temperature probe 142 is located in the second air passageway, in the discharge throat of the second blower unit 109, and is also functionally coupled by a probe line 143 to the burner controller 138.

Heat insulating material 128 is disposed on the interior wall of upper cabinet 93 in proximity to the intake opening 95 to minimize heat loss. A baffle plate 127 surrounds the intake opening adjacent the burner 129 to channel incoming air into heating proximity of the burner.

Large blower unit 108 has an axial impeller 144 having a plurality of circumferentially spaced impeller blades or vanes located within a scroll-type housing 145. The housing has a rectangular discharge throat 115 open to and associated with connecting duct 120, as previously described. A turning vane 146 is disposed in the inlet to the tunnel 31 to facilitate air flow into the tunnel. A motor 147, electrically coupled to a controller, indicated schematically at 148 in FIG. 1, is connected through power transmitting means, as the belts 149, to impeller 144. Suitable framework 150 secures the housing 145 in place in lower cabinet 94.

Small blower unit 109 is significantly smaller than the first blower unit 108, and includes an axial impeller 152 disposed within a housing 153 operably connected by belt means 154 to a motor 155. The discharge throat 122 of the housing 153 opens into the air conveying duct 126. The motor 155 is electrically coupled to a suitable motor controller 156.

Lower cabinet 94 is provided with a pair of air recirculating ducts 163, 164 disposed between the chamber of the cabinet 94 and the interior of the room to provide room air for recirculating with fresh air drawn in through the fresh air intake means. A plurality of relatively spaced parallel louvers 165 are disposed across the openings of the ducts 163, 164.

The second damper assembly 114 includes a plurality of damper blades functionally assembled as described for the first damper assembly 99. The second damper assembly 114 is biased in the open position and is connected to a servo-motor 158 operable to close the assembly. Servo-motor 158 is electrically connected to the motor controller 156 of the second blower unit 109 whereby upon activation of the second blower unit 109, servo-motor 158 operates to close the second damper assembly 114. When the second blower unit 109 is switched off, the damper assembly 114 returns to the normally open position. Room temperature responsive means, such as a wall thermostat indicated at 160 in FIG. 1, is electrically connected as by line 161 to the motor controller 156 of the second blower unit. In addition, the burner controller 138 is electrically connected to the motor controller 156 of the second blower unit.

The third damper assembly 125 includes a plurality of horizontally disposed dampers hingedly connected about a horizontal axis across the discharge opening 122 of the second blower unit 109. The damper assembly is held by gravity in a closed position and is adapted to open in response to air pressure provided by the second blower unit 109.

Referring to FIG. 1, a first floor switch 167 is disposed adjacent the entryway 28 of building 10. Floor switch 167 is, for example, a pressure switch having a switch line 168 extending to the motor controller 148 of the large blower unit 108. A second similar floor switch 170 is disposed between the washing station and the rinse station 30 in the building 10. Floor switch 170 has a switch line 171 extending to the burner controller 138.

In the operation of the invention, a vehicle enters the building 10 through entryway 28 and trips the first floor switch 167. Responsive to the switch, motor controller 148 supplies power to motor 147 to start the large blower 108. The blower remains on for a preselected period of time, for example three minutes, and then shuts off unless floor switch 167 is again tripped. As the vehicle proceeds through the wash bay and approaches the rinse station 30, it trips the second floor switch 170. Responsive to the switch, burner controller 138 activates burner 129. The burner remains on for a preselected period of time, for example one minute, and then shuts down unless the second floor switch 170 is again tripped. Blower 108 by now has reached operating speed and is drawing fresh air through the intake means along the first passageway. As the air passes the burner, it is heated to a preselected temperature, for example 200° F. Part of the passing air is used in burner combustion. Temperature probe 139 senses the temperature of the heated air. Burner controller 138 responds to signals from the temperature probe 139 if the air has a higher or lower temperature than the preselected temperature, and supplies more or less fuel to the burner 129 accordingly.

In the preferred embodiment, outside air drawn through the intake means comprises 50 percent of the air supplied to the large blower unit 108, the remainder being recirculated air drawn through the recirculating ducts 163, 164. While the use of 100 percent fresh outside air would be preferable, it has been found satisfactory and economical to use 50 per cent recirculated air. It is understood that, if desired, damper assembly 99 of the intake means could be provided with means for adjusting the dampers to any desired intermediate position between open and closed whereby the ratio of fresh air to recirculated air could be varied according to the option of the operator. The vehicle proceeds, via conveying means 27, through the archway 38 of the air discharge tunnel 31 where it is completely dried as previously described. The air, having been heated by the direct fire burner 129, has a very low humidity. Steam within the drying area is kept to a minimum. Upon exiting the building, if the weather outside is cold, nonetheless the windows of the vehicle will not fog and the locks will not freeze as frequently occurs when a vehicle leaves a car wash assembly into a cold environment.

In the normal operation of drying vehicles, enough hot air is provided through the discharge tunnel 31 to heat the building. Means are provided for the heating of the building when the air discharge tunnel is inoperative as at night or on holidays. Thermostat 160 is set to a preselected, comfortable room temperature. Motor controller 156 of small blower unit 109 responds to a signal from thermostat 160 when the room temperature drops below the preselected value. The motor controller 156 supplies power to the motor 155 of blower unit 109 to start the blower unit and supplies a signal to the burner controller 138 to start the burner 129. Motor controller 156 also provides a signal to the servo-motor 158 to close the second damper assembly 114. Fresh air is drawn through the intake means and is heated by the burner 129. The air proceeds through the second passageway and exits the duct 126. Temperature probe 142 senses the temperature of the passing air and is operative to pass a signal to the burner controller 138 to supply more or less fuel to the burner according to whether the air temperature is lower or higher than a preselected value. When the thermostat 160 senses that adequate heat has been supplied to the building, motor controller 156 is operative to shut off the burner 129 and the small blower unit 109. The second damper assembly 114 returns to the normally open position.

The advantages of heating air with a direct fire line burner are indicated in U.S. Pat. No. 3,051,464. Air temperature control is greatly improved. Direct heating of the air is faster and more economical than indirect heating. The building being heated is, to a small degree, pressurized whereby cold drafts and the like are eliminated. In cold weather, frost does not form on windows. The air in the building is frequently changed, providing fresh clean air.

Due to the efficiency of the air discharge tunnel 31 and the direct line fire burner 129, the power requirement for the large blower unit 108 is relatively low. In practice, an electric motor 147 to drive the blower unit 109 having 75 hp has proven adequate, whereas air dryers of the prior art employ electric motors of up to 140 hp and higher. Noise in the drying station is significantly reduced. Additionally, in practice a motor 155 to drive the small blower unit 109 of 5 hp has proven adequate.

The embodiments of the invention in which an exclusive property or privilege is claimed are defined as follows:

1. An apparatus for removing fluid from the surface of an object, said apparatus of the type operated in the interior of a closed building, comprising:

a first pair of linear air discharge means constituted as a first linear air discharge means and a second linear air discharge means;

said second air discharge means angularly disposed to the first air discharge means and having an end adjacent an end of the first air discharge means forming a generally V-shape with the first air discharge means adapted to provide a wedge-shaped air stream;

air supply means including fresh air intake means communicating with the atmosphere outside the building; a first air passageway connecting the intake means with the air discharge means; a second air passageway connecting the intake means with the interior of the building; blower means operable to draw outside air through the intake means and supply air selectively through the first passageway to the air discharge means and through the second passageway to the interior of the building; and heater means communicating with said intake means to heat air flowing through said intake means.

2. The apparatus of claim 1 including: a second pair of linear air discharge means relatively disposed forming a V-shape in general alignment with the V-shape formed by the first pair of air discharge means.

3. The apparatus of claim 1 including: a plurality of pairs of linear air discharge means relatively disposed forming a series of V shapes.

4. The apparatus of claim 3 including: an air discharge tunnel having a pair of upwardly extending legs and a top section bridging the legs and defining an archway adapted to accommodate a vehicle, said legs and top section having interconnected air chambers, said air supply means operable to supply air to one of said chambers, said pairs of air discharge means located on said top section open to the air chamber of the top section and directed generally downward into the archway.

5. The apparatus of claim 4 including: a pair of air discharge means located on each of said legs open to the chambers of said legs and directed generally inward into the archway.

6. The apparatus of claim 5 wherein: said air discharge means include air discharge nozzles.

7. The apparatus of claim 1 wherein: said heater means includes a direct line fire burner.

8. The apparatus of claim 1 wherein said blower means includes: a first blower unit disposed in the first air passageway and a second blower unit disposed in the second air passageway.

9. The apparatus of claim 8 including: first floor switch means connected to the first blower operable to activate the first blower for a preselected period of time, and second floor switch means spaced from the first floor switch means connected to the heater means operable to activate the heater means for a preselected period of time.

10. The apparatus of claim 1 including:

first closure means disposed in the first air passageway operable to close the first air passageway;

second closure means normally closing the second air passageway when the first air passageway is open;

said blower means adapted to supply air to the interior of the building through the second air passageway when the first air passageway is closed; and means operative to open said second closure means when the blower means is operative to supply air through the second air passageway.

11. The apparatus of claim 10 including: room temperature sensitive means connected to said blower means operable to cause said blower means to supply air through the second air passageway.

12. A vehicle drying assembly of the type installed in a closed building, for drying vehicles and heating the building, including:

air discharge means adapted to direct air toward the surface of a vehicle;

fresh air intake means communicating with the atmosphere outside the building;

a first air passage connecting the intake means with the air discharge means;

a second air passage connecting the intake means with the interior of said building;

first closure means disposed in the first air passage in a normally open position movable to a closed position to close said first air passage;

second closure means disposed in the second air passage normally closing said second air passage when the first air passage is open;

heater means disposed in the intake means to heat air flowing through said intake means;

blower means to draw outside air through said intake means operable to supply said air to the first air passage when the first closure means is in the normally open position;

said blower means operable to open said second closure means and supply air to the second air passage when the first closure means is in the closed position; and room temperature sensitive means operably connected to the blower means to close the first closure means whereby blower means supplies air through the second air passage.

13. The vehicle drying assembly of claim 12 wherein: said heater means includes a direct line fire burner.

14. The vehicle drying assembly of claim 12 wherein said blower means includes: a first blower unit disposed in the first air passage and a second blower unit disposed in the second air passage, said room temperature sensing means being connected to the second blower unit.

15. The vehicle drying assembly of claim 12 including:

recirculating ducts communicating between the first air passageway and the interior of the building whereby a portion of the air supplied to the air discharge means is recirculated air.

16. A vehicle drying assembly of the type installed in a closed building, for drying vehicles and heating the building, including:

air discharge means adapted to direct air toward the surface of a vehicle;

fresh air intake means communicating withh the atmosphere outside the building;

a first air passageway connecting the intake means with the air discharge means;

a second air passageway connecting the intake means with the interior of the building;

blower means operable to draw outside air through the intake means and supply air selectively through the first air passageway to the air discharge means and through the second air passageway to the interior of the building; and heater means communicating with said intake means to heat air flowing through said intake means.

17. The vehicle drying assembly of claim 16 including: recirculating ducts communicating between the first air passageway and the interior of the building whereby a portion of the air supplied to the air discharge means is recirculated air.

18. The vehicle drying assembly of claim 16 including: room temperature sensitive means operably connected to the blower means whereby the blower means is selectively operable to supply air through the second air passageway in response to room temperature.

* * * * *

PO-1050
(5/69)

UNITED STATES PATENT OFFICE
CERTIFICATE OF CORRECTION

Patent No. 3,805,410 Dated April 23, 1974

Inventor(s) Dean C. Rupp

It is certified that error appears in the above-identified patent and that said Letters Patent are hereby corrected as shown below:

Column 1, line 64, "With" should be --When--.

Table A, line 14, cancel "r".

Table A, line 18, "**" should be --7/8--.

Table A, line 27, "5-" should be --5-3/4--.

Column 12, line 35, "withh" should be --with--.

Signed and sealed this 10th day of September 1974.

(SEAL)
Attest:

McCOY M. GIBSON, JR.
Attesting Officer

C. MARSHALL DANN
Commissioner of Patents